United States Patent
Arndt et al.

(10) Patent No.: US 12,046,378 B2
(45) Date of Patent: Jul. 23, 2024

(54) FUEL ROD SENSOR SYSTEM WITH INDUCTIVE COUPLING

(71) Applicant: Westinghouse Electric Company LLC, Cranberry Township, PA (US)

(72) Inventors: Jeffrey L. Arndt, Pittsburgh, PA (US); Jorge V. Carvajal, Irwin, PA (US); Shawn C. Stafford, Scottdale, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 507 days.

(21) Appl. No.: 17/411,424

(22) Filed: Aug. 25, 2021

(65) Prior Publication Data

US 2022/0044831 A1 Feb. 10, 2022

Related U.S. Application Data

(63) Continuation of application No. 16/564,150, filed on Sep. 9, 2019, now Pat. No. 11,127,507.

(51) Int. Cl.
*G21C 17/10* (2006.01)
*G21C 17/06* (2006.01)
(Continued)

(52) U.S. Cl.
CPC ........... *G21C 17/102* (2013.01); *G21C 17/06* (2013.01); *G21C 17/112* (2013.01); *G21C 3/16* (2013.01); *H04Q 2209/47* (2013.01)

(58) Field of Classification Search
CPC .... G21C 17/102; G21C 17/06; G21C 17/112; G21C 17/10; G21C 3/16; Y02E 30/30; H04Q 9/00
See application file for complete search history.

(56) References Cited

U.S. PATENT DOCUMENTS 10,284,307 B2  5/2019  Cho et al.
10,365,775 B2  7/2019  Sharma
(Continued)

FOREIGN PATENT DOCUMENTS

KR  20120044563 A  5/2012
TW     201246912 A  11/2012
(Continued)

OTHER PUBLICATIONS

International Search Report and Written Opinion for International PCT Application No. PCT/US2020/049461, dated Nov. 30, 2020.
(Continued)

*Primary Examiner* — Francis C Gray
(74) *Attorney, Agent, or Firm* — K&L Gates LLP

(57) ABSTRACT

A sensor system for a fuel rod including a fuel pellet stack, the sensor system including a wireless interrogator disposed outside the fuel rod and a passive sensor component disposed within the fuel rod. The passive sensor component includes a receiver structured to receive an interrogation signal and output an excitation signal in response to receiving the interrogation signal, a reference transmitter structured to output a reference signal to the reference receiver in response to the excitation signal, a sensing transmitter structured to output a sensing signal to the sensing receiver in response to the excitation signal, and a core at least partially disposed within the sensing transmitter and coupled to move in conjunction with expansion or contraction of the fuel pellet stack, to move based on changes in pressure within the fuel rod, or to change temperature based on temperature changes within the fuel rod.

20 Claims, 7 Drawing Sheets

(51) Int. Cl.
    *G21C 17/112*    (2006.01)
    *G21C 3/16*    (2006.01)

(56) References Cited

U.S. PATENT DOCUMENTS

| | | | |
|---|---|---|---|
| 10,706,977 B2 * | 7/2020 | James | G21C 17/116 |
| 10,832,825 B2 * | 11/2020 | Carvajal | G21C 17/112 |
| 2014/0015940 A1 | 1/2014 | Yoshida | |
| 2014/0203783 A1 * | 7/2014 | Kiesel | H01M 10/44 |
| | | | 320/167 |
| 2014/0266166 A1 * | 9/2014 | Youngquist | G01D 5/2073 |
| | | | 324/207.17 |
| 2019/0180884 A1 | 6/2019 | Carvajal et al. | |
| 2020/0402680 A1 * | 12/2020 | Carvajal | G21F 5/008 |
| 2021/0074441 A1 | 3/2021 | Arndt et al. | |

FOREIGN PATENT DOCUMENTS

| | | |
|---|---|---|
| TW | 201724770 A | 7/2017 |
| TW | 201732520 A | 9/2017 |
| WO | 2021050385 A1 | 9/2020 |

OTHER PUBLICATIONS

Search Report for corresponding Taiwanese Application No. 111116812 mailed Feb. 20, 2024.

* cited by examiner

FUEL ROD SENSOR SYSTEM WITH INDUCTIVE COUPLING

FIELD

The disclosed concept pertains generally to nuclear power equipment and, more particularly, to a sensor system usable with a fuel rod of a fuel assembly of a nuclear reactor.

BACKGROUND OF THE INVENTION

Nuclear reactor systems include many types of sensors for monitoring various characteristics of the system. One type of sensor is designed to monitor centerline fuel temperature, fuel pellet stack elongation, and internal fuel rod pressure.

FIG. 1 is a schematic diagram of a sensor designed to monitor centerline fuel temperature, fuel pellet stack elongation, and internal fuel rod temperature. The sensor includes a passive sensor component 10 located within a fuel rod 2 of a nuclear reactor and a wireless interrogator 20 located within an instrument thimble 4 of the nuclear reactor. The passive component 10 includes an inductor 12 and a capacitor 14 which together form a resonant circuit. The wireless interrogator 20 includes a transmitter 22 and a receiver 24 and is electrically connected to an electronic apparatus 30 outside the nuclear reactor core.

The sensor operates by passing current through the transmitter 22, which causes it to generate an interrogation signal that is received by and excites the passive component 10. In response, the passive component 10 generates a response signal that is received by the receiver 24. The response signal includes characteristics indicative of centerline fuel temperature, fuel pellet stack elongation, and internal fuel rod temperature. These characteristics change the inductance of the inductor 12 and are reflected in the response signal, for example by changes in the frequency of the response signal.

In some methodologies, a ferrite core coupled to a stack of fuel pellets is passed through the inductor 12, which results in changes in the inductance of the inductor 12 as the stack of fuel pellets elongates.

The sensitivity of the sensor of FIG. 1 is limited. Thus, there is room for improvement in sensors within fuel rods.

SUMMARY

Embodiments of the disclosed concept provide an improved sensor for monitoring centerline fuel temperature, fuel pellet stack elongation, and/or internal fuel rod pressure.

As one aspect of the disclosed concept, a sensor system for a fuel rod including a fuel pellet stack comprises: a wireless interrogator disposed outside the fuel rod, the wireless interrogator comprising: a transmitter structured to wirelessly output an interrogation signal; a reference receiver; and a sensing receiver; a passive sensor component disposed within the fuel rod, the passive sensor component comprising: a receiver structured to receive the interrogation signal and output an excitation signal in response to receiving the interrogation signal; a reference transmitter structured to output a reference signal to the reference receiver in response to the excitation signal; a sensing transmitter structured to output a sensing signal to the sensing receiver in response to the excitation signal, wherein the receiver, the reference transmitter, and the sensing transmitter are electrically connected in series; and a core at least partially disposed within the sensing transmitter and coupled to move in conjunction with expansion or contraction of the fuel pellet stack, to move based on changes in pressure within the fuel rod, or to change temperature based on temperature changes within the fuel rod.

As one aspect of the disclosed concept, a sensor system for a fuel rod including a fuel pellet stack comprises: a wireless interrogator disposed outside the fuel rod, the wireless interrogator comprising: a primary transmitter structured to wirelessly output an interrogation signal; and a secondary receiver; a passive sensor component disposed within the fuel rod, the passive sensor comprising: a primary receiver structured to receive the interrogation signal and output an excitation signal in response to receiving the interrogation signal; a linear differential variable transformer (LVDT) including a core coupled to move in conjunction with expansion or contraction of the fuel pellet stack, to move based on changes in pressure within the fuel rod, or to change temperature based on temperature changes within the fuel rod, wherein the LVDT is structured to receive the excitation signal and to output an output signal indicative of a position or a temperature of the core; and a secondary transmitter structured to receive the output signal from the LVDT and to output a response signal proportional to the output signal to the secondary receiver.

As another aspect of the disclosed concept, a system comprises: at least one fuel rod including a fuel pellet stack; and at least one sensor system comprising: a wireless interrogator disposed outside the fuel rod, the wireless interrogator comprising: a primary transmitter structured to wirelessly output an interrogation signal; and a secondary receiver; a passive sensor component disposed within the fuel rod, the passive sensor comprising: a primary receiver structured to receive the interrogation signal and output an excitation signal in response to receiving the interrogation signal; a linear differential variable transformer (LVDT) including a core coupled to move in conjunction with expansion or contraction of the fuel pellet stack, to move based on changes in pressure within the fuel rod, or to change temperature based on temperature changes within the fuel rod, wherein the LVDT is structured to receive the excitation signal and to output an output signal indicative of a position or a temperature of the core; and a secondary transmitter structured to receive the output signal from the LVDT and to output a response signal proportional to the output signal to the secondary receiver.

As another aspect of the disclosed concept, a method of sensing fuel rod characteristics in a fuel rod including a fuel pellet stack comprises: providing a wireless interrogator disposed outside the fuel rod; providing a passive sensor component disposed within the fuel rod, the passive sensor including a linear differential variable transformer (LVDT) including a core coupled to move in conjunction with expansion or contraction of the fuel pellet stack, to move based on changes in pressure within the fuel rod, or to change temperature based on temperature changes within the fuel rod, wherein the LVDT is structured to receive the excitation signal and to output an output signal indicative of a position or a temperature of the core; wirelessly outputting an interrogation signal from the wireless interrogator to the passive sensor component; providing an excitation signal to the LVDT in response to receiving the wireless interrogation signal; outputting an output signal indicative of a position or a temperature of the core from the LVDT; and wirelessly outputting a response signal proportional to the output signal from the passive sensor component to the wireless interrogator.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
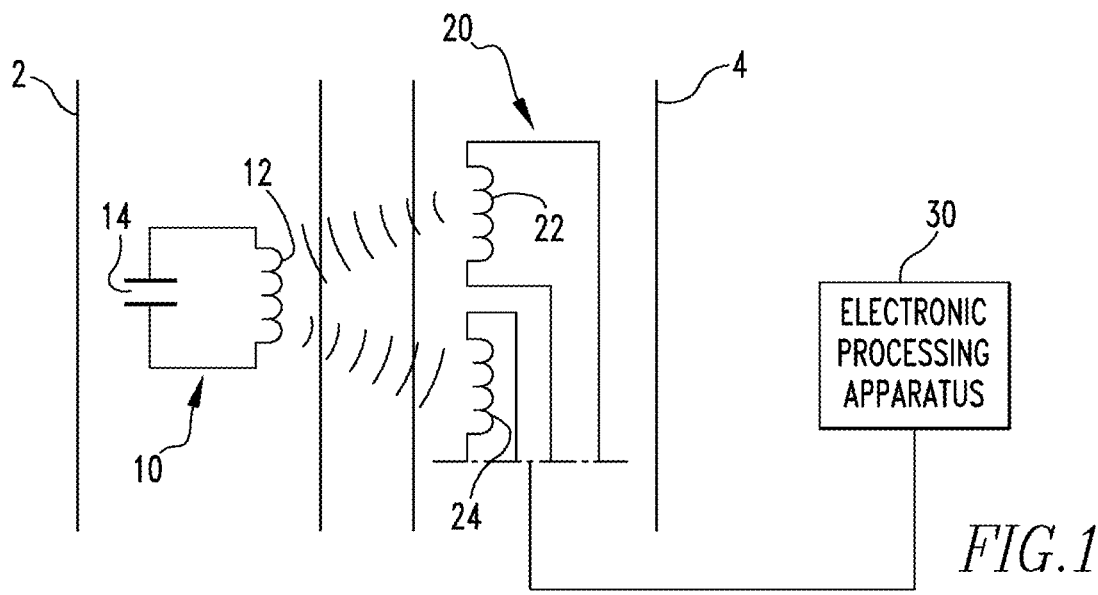
FIG. 1 is a schematic diagram of a sensor designed to monitor centerline fuel temperature, fuel pellet stack elongation, and internal fuel rod pressure with limited sensitivity.
Figure 2:
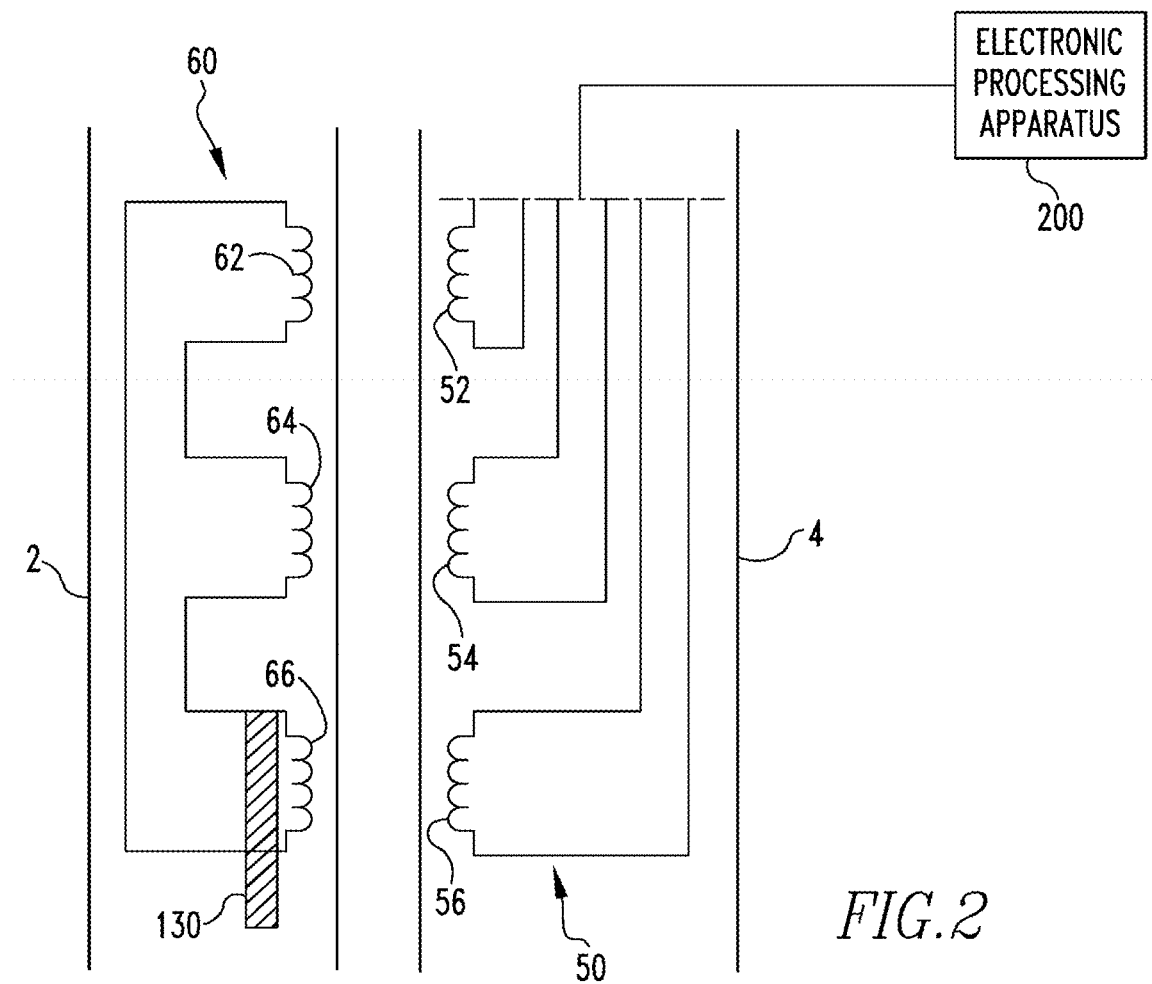
FIG. 2 is a schematic diagram of a sensor system delivering increased measurement sensitivity in accordance with an example embodiment of the disclosed concept.

FIG. 2 is a schematic diagram of a sensor system in accordance with an example embodiment of the disclosed concept. The sensor system is suitable for monitoring a centerline fuel temperature, fuel pellet stack elongation, and/or internal fuel rod pressure in a nuclear reactor system.

The sensor system includes a passive component 60 and a wireless interrogator 50. The passive component 60 is disposed within a fuel rod 2 of the nuclear reactor and the wireless interrogator 50 is disposed within an instrument thimble of the nuclear reactor. The wireless interrogator 50 is coupled to an electronic processing apparatus 200 located outside the nuclear reactor core. The fuel rod 2 is entirely enclosed while the instrument thimble 4 includes a penetration through which electrical conductors can pass such as electrical conductors between the wireless interrogator 50 and the electronic processing apparatus 200. It will also be appreciated that the wireless interrogator 50 may be disposed in a region adjacent to the fuel rod 2. For example, the wireless interrogation 50 may be disposed in a different enclosure than the instrument thimble 4 without departing from the scope of the disclosed concept.

The wireless interrogator 50 includes a transmitter 52, a reference receiver 54, and a sensing receiver 56. The transmitter 52, the reference receiver 54, and the sensing receiver 56 may be inductors (also referred to as coils). The passive component 60 includes a receiver 62, a reference transmitter 64 and a sensing transmitter 66 electrically connected in series. The receiver 62, the reference transmitter 64, and the sensing transmitter 66 may be inductors (also referred to as coils). The passive component 60 also includes a core 130. The core 130 is disposed at least partially within the sensing transmitter 66.

The transmitter 52 is structured to generate an interrogation signal. For example, the electronic processing apparatus 200 may generate and provide a signal to the transmitter 52 which energizes the transmitter 52 and causes it to generate the interrogation signal. The interrogation signal may be a continuous sinusoid wave or pulsed wave that is received by and excites the receiver 62. For example, the interrogation signal may be a time varying magnetic field generated by the transmitter 52 which produces an electromotive force on the receiver 62, causing current to flow through the receiver 62, and in turn through the reference transmitter 64 and the sensing transmitter 66. The current through the reference transmitter 64 and the and the sensing transmitter 66 causes them to generate a reference signal and a sensing signal, respectively, that are received by the reference receiver 54 and the sensing receiver, respectively. For example, the reference signal and the sensing signal may be time varying magnetic fields generated by the reference transmitter 64 and the sensing transmitter 66 in response to current flowing through them, which in turn produces electromagnetic forces in the reference receiver 54 and the sensing receiver 56.

The core 130 is physically coupled to a fuel pellet stack within the fuel rod 2. In some example embodiments, the core 130 is coupled such that the core 130 moves rectilinearly with the fuel pellet stack. For example, as the fuel pellet stack swells or expands, the core 130 will move upward through the sensing transmitter 66 the same distance that the fuel pellet stack has elongated. In this manner, the physical displacement of the core 130 within the sensing transmitter 66 will change the voltage across the sensing transmitter 66, thus changing the sensing signal, which is in turn received by the sensing receiver 56 and can be used to determine fuel pellet stack elongation. In some example embodiments, the core 130 is coupled such that changes in temperature of the fuel pellet stack change the temperature of the core 130. The change in temperature of the core 130 changes magnetic permeability resulting in a change in voltage across the sensing transmitter 66. This results in a change in the sensing signal which is received by the sensing receiver 56 and can be used to determine centerline fuel temperature. In some example embodiments, the core 130 is coupled such that changes in pressure within the fuel rod cause the core 130 to move with changes in temperature. For example, the core 130 may be coupled to bellows within the fuel rod 2 such that increases in pressure cause the bellows to expand and move the core 130 further within the sensing transmitter 66. The physical displacement of the core 130 within the sensing transmitter 66 will change the voltage across the sensing transmitter 66, thus changing the sensing signal, which is in turn received by the sensing receiver 56 and can be used to determine pressure within the fuel rod 2. In these example embodiment, the centerline fuel temperature, fuel pellet stack elongation, and fuel pressure are considered the sensed parameters and their values affect the sensing signal. However, their values have little effect on the reference signal output by the reference transmitter 64.

The sensing signal and the reference signal are received by the sensing receiver 56 and reference receiver 54, respectively. The difference between these two signals may be used to determine the sensed parameter, as the difference between the sensing signal and the reference signal cancels out any drift due to temperature or other effects common to the reference transmitter 64, the sensing transmitter 66, and other components.

Figure 3:
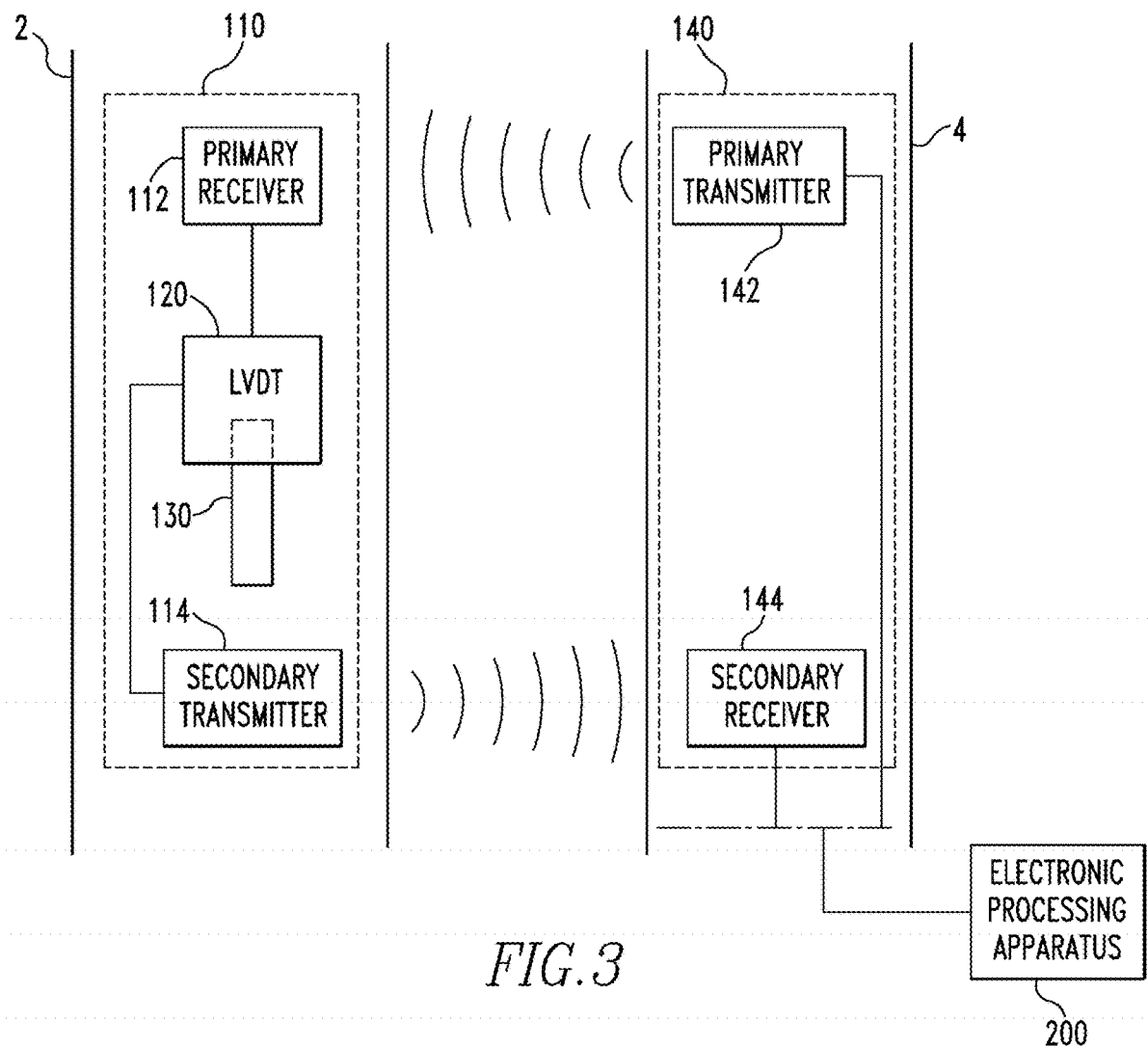
FIG. 3 is a schematic diagram of a sensor system delivering increased measurement sensitivity in accordance with another example embodiment of the disclosed concept.

FIG. 3 is a schematic diagram of a sensor in accordance with an example embodiment of the disclosed concept. The sensor is suitable for monitoring centerline fuel temperature, fuel pellet stack elongation, and internal fuel rod pressure in a nuclear reactor system.

The sensor includes a passive component 110 and a wireless interrogator 140. The passive component 110 is disposed within a fuel rod 2 of the nuclear reactor and the wireless interrogator 140 is disposed within an instrument thimble 4 of the nuclear reactor. The wireless interrogator 140 is coupled to an electronic processing apparatus 200 located outside the nuclear reactor core.

The wireless interrogator 140 includes a primary transmitter 142 and a secondary receiver 144. The passive component 110 includes a primary receiver 112 that corresponds to the primary transmitter 142 of the wireless interrogator 140 and a secondary transmitter 114 that corresponds to the secondary receiver 144 of the wireless interrogator 140. For example, the primary transmitter 142 is structured to output an interrogation signal and the primary receiver 112 is structured to receive the interrogation signal. Also, the secondary transmitter 114 is structured to output a response signal and the secondary receiver 144 is structured to receive the response signal. It is to be understood that the interrogation signal, response signal, or any other signals exchanged between the wireless interrogator 140 and the passive component 110 are wireless signals as the passive component 110 is fully enclosed within the fuel rod 2 and does not have a wired connection to any components outside the fuel rod 2.

The passive component 110 also includes a linear variable differential transformer (LVDT) 120. The LVDT 120 is structured to sense rectilinear motion of a core 130 included with the LVDT 120 within the fuel rod. In some example embodiments, the core 130 is coupled such that it moves rectilinearly with the fuel pellet stack in order to sense fuel pellet stack elongation. In some example embodiments, the core 130 is coupled such that it move rectilinearly based on pressure within the fuel rod 2, for example, by using bellows as previously described, to sense fuel pressure. In some example embodiments, the core 130 is coupled such that it is static and its temperature changed with centerline fuel temperature. For example, to measure centerline fuel temperature, the core 130 may be static in that it does not move and have varying permeability along its length. Heat will travel from the fuel pellet stack up the core 130 such that the bottom of the core 130 will be hotter than the top of the core 130. The different temperatures will result in different voltages being output by coils of the LVDT 120 resulting in an output of the LVDT 120 that is similar to if the core 130 had moved in the LVDT 120. The centerline temperature of the fuel can be determined from this output.

In some example embodiments of the disclosed concept the core 130 is composed of ferrite material. However, it will be appreciated that the core 130 may be composed of other suitable materials without departing from the scope of the disclosed concept.

The LVDT 120 is electrically connected to the primary receiver 112 and the secondary transmitter 114. The LVDT 120 is structured to receive an excitation signal from the primary receiver 112. To generate the excitation signal, the electronic processing apparatus 200 provides a signal to the primary transmitter 142, causing the primary transmitter 142 to output the interrogation signal. The primary receiver 112 receives the interrogation signal, which excites the primary receiver 112 and causes the primary receiver 112 to output the excitation signal to the LVDT 120.

The excitation signal causes the LVDT 120 to generate an output signal that is indicative of the position of the core 130. For example, at a null position, where the core 130 is centered within the LVDT 120, the output signal of the LVDT 120 will be about 0 V. As the core 130 moves from the null position, the voltage of the output signal will increase linearly. A phase angle of the output signal is indicative of which direction the core 130 has moved with respect to the null position. The LVDT 120 is structured to provide the output signal to the secondary transmitter 114.

Receiving the output signal from the LVDT 120 causes the secondary transmitter 114 to output the response signal, which is in turn received by the secondary receiver 144 and provided to the electronic processing apparatus 200. The response signal is proportional to the output signal of the LVDT 120. Thus, any increases or decreases in the voltage of the output signal of the LVDT 120 are reflected in the response signal. Similarly, the phase angle of the output signal of the LVDT 120 is reflected in the response signal. From the response signal, the electronic processing apparatus 200 is able to determine the position of the core 130 within the LVDT 120.

The LVDT 120 is able to more accurately sense the rectilinear motion and position of the core 130. In some example embodiments, the LVDT 120 can monitor the position of the core 130 within ±2 μm.

While the example embodiment of FIG. 3 illustrates the wireless interrogator 140 as being within the instrument thimble 4, it will be appreciated that the wireless interrogator 140 can be disposed at other location outside the fuel rod 2 without departing from the scope of the disclosed concept.

Figure 4:
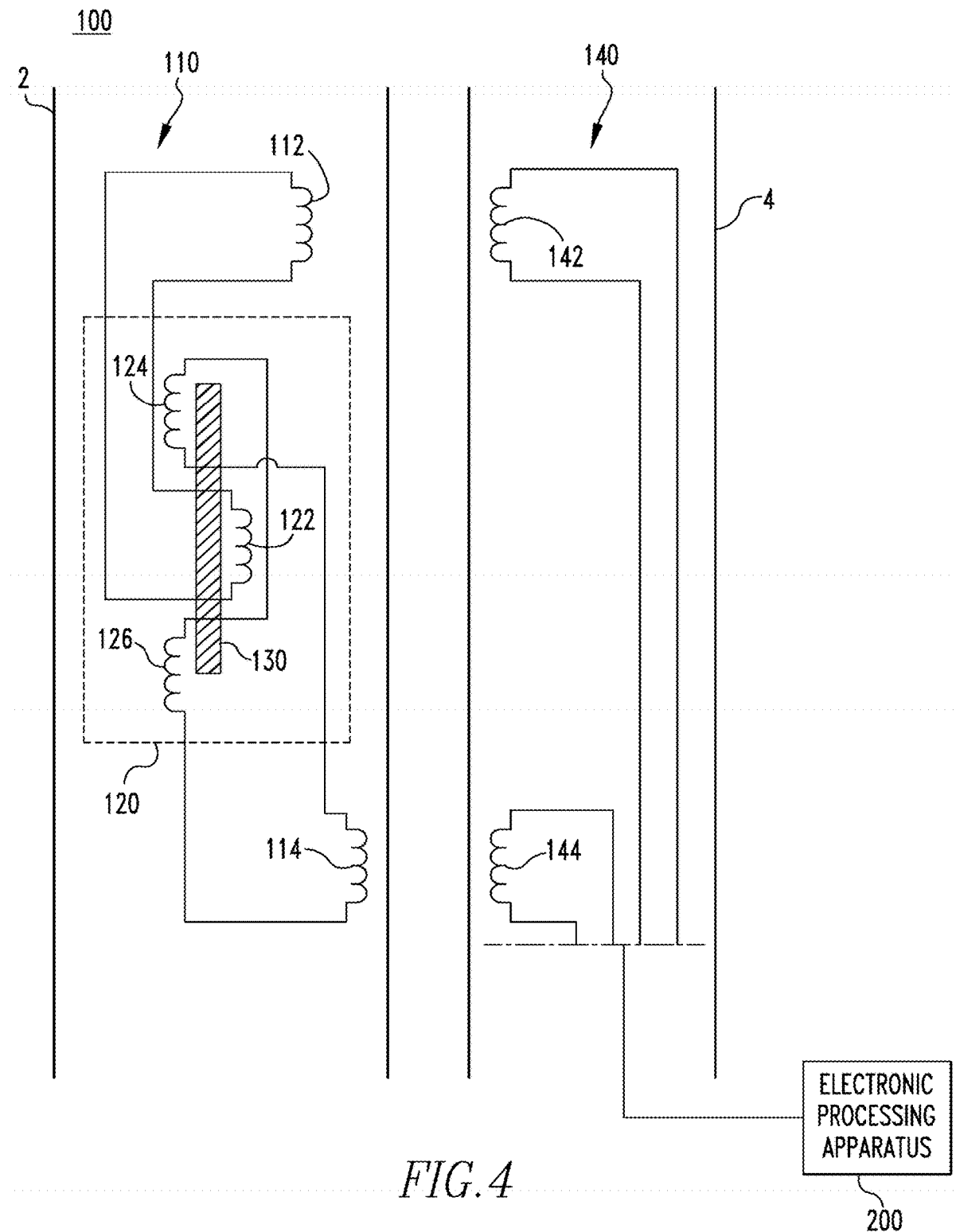
FIG. 4 is a schematic diagram of a sensor system in accordance with an example embodiment of the disclosed concept.

FIG. 4 is a schematic diagram of a sensor in accordance with an example embodiment of the disclosed concept. The sensor of FIG. 4 operates similar to the sensor of FIG. 3. However, FIG. 4 illustrates an example embodiment of the LVDT 120 in more detail.

For example, in the example embodiment of FIG. 4, the LVDT 120 includes a primary coil 122, a first secondary coil 124, and a second secondary coil 126. The primary coil 122 is disposed between the first secondary coil 124 and the second secondary coil 126. The primary coil 122, the first secondary coil 124, and the second secondary coil 126 are aligned such that the core 130 is able to pass through all of them. In FIG. 3, the core 130 is disposed in the null position where it is centered in the LVDT 120. That is, the center of the core 130 is aligned with the center of the primary coil 122 and equal lengths of the core 130 extend into the first secondary coil 124 and the second secondary coil 126.

The first secondary coil 124 and the second secondary coil 126 are equally spaced from the primary coil 122. For example, an end of the first secondary coil 124 is spaced equally from the center of the primary coil 122 as an end of the second secondary coil 126. The primary coil 122 is electrically connected to the output of the primary receiver 112 such that the primary coil 122 is structured to receive the excitation signal from the primary receiver 112. In an example embodiment, the first and second secondary coils 124,126 each have a first end closest to the primary coil 122 and a second end furthest from the primary coil 122. The first end of the first secondary coil 124 is electrically connected to an output of the LVDT 120 and the second end of the first secondary coil 124 is electrically connected to the first end of the second secondary coil 126. The second end of the second secondary coil 126 is electrically connected to the output of the LVDT 120. However, it will be appreciated that the positions of the first and second secondary coils 124,126 can be swapped without departing from the scope of the disclosed concept.

When the primary coil 122 receives the excitation signal, the primary coil 122 induces a current in the core 130, which is then sensed by the first and second secondary coils 124,126. When the core 130 is in the null position, as shown in FIG. 3, the outputs of the first and second secondary coils 124,126 cancel each other, resulting in the output signal of the LVDT 120 being 0 V. As the core 130 moves from the null position, more of the core 130 will be disposed within one of the first or second secondary coils 124,126 than the other. This results in the output of one of the first or second secondary coils 124,126 being greater than the output of the other because the greater length of core 130 in one of the first and second secondary coils 124,126 will result in a greater output in that coil compared to the other. As a result, the output of the LVDT 120 will linearly increase as the core 130 moves further into one of the first and second secondary coils 124,126. Also, when the core 130 is moved in one direction from the null position, the output of the LVDT 120 will have a first phase angle and when the core 130 moves in the other direction from the null position, the output of the LVDT 120 will have a second phase angle. Thus, the magnitude of the output signal of the LVDT 120 provides an indication of the distance the core 130 has moved from the null position and the phase angle of the output signal of the LVDT 120 provides an indication of the direction that the core 130 has moved. Taking these together, the output signal of the LVDT 120 provides an accurate indication of the position of the core 130.

As in the embodiment shown in FIG. 3, the output signal of the LVDT 120 is provided to the secondary transmitter 114. Receiving the output signal of the LVDT 120 causes the secondary transmitter 114 to output the response signal, which is proportional to the output signal of the LVDT 120. The response signal is received by the secondary receiver 144 and is provided to the electronic processing apparatus 200. The electronic processing apparatus 200 is structured to interpret the response signal to determine the position of the core 130.

In some example embodiments of the disclosed concept, the first and second secondary coils 124,126 are substantially similar. That is, they have a substantially similar length and number of windings and are composed of substantially similar materials. When the first and second secondary coils 124,126 are substantially similar, their outputs will cancel each other out when the core 130 is in the null position and the output of the LVDT 120 will linearly increase as the core 130 moves from the null position. The primary coil 122 may or may not be substantially similar to the first and second secondary coils 124,126 without departing from the scope of the disclosed concept.

In some example embodiments of the disclosed concept, the primary transmitter 142, the primary receiver 112, the secondary transmitter 114, and the secondary receiver 144 are coils. However, it will be appreciated that other components capable of wirelessly transmitting or receiving signals may be employed without departing from the scope of the disclosed concept.

Figure 5A:
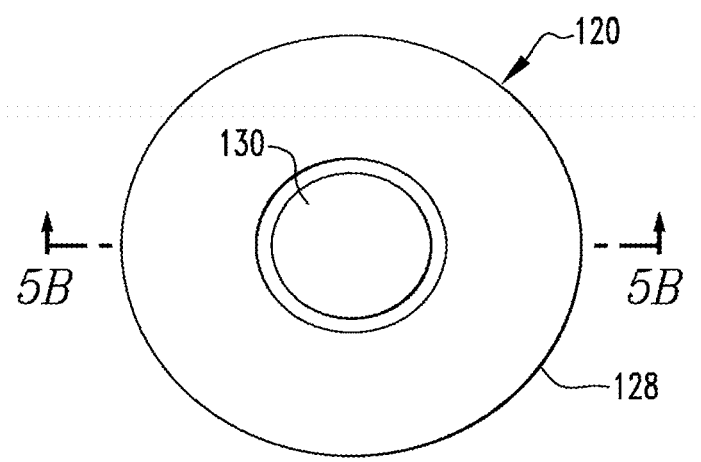
FIG. 5A is a top view of a linear variable differential transformer in accordance with an example embodiment of the disclosed concept.
Figure 5B:
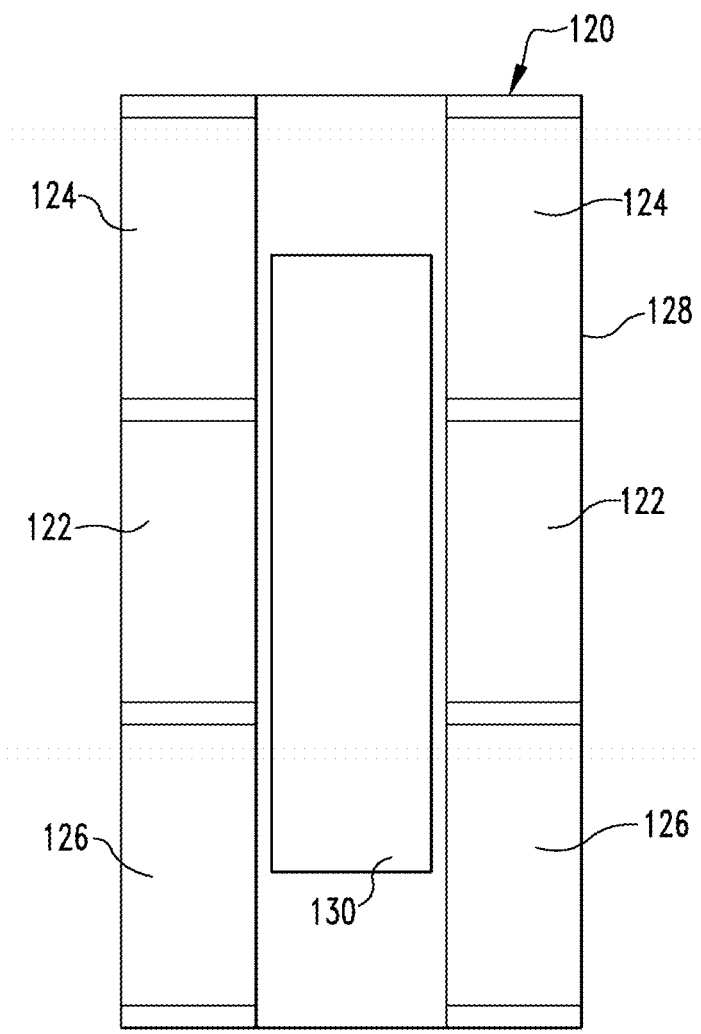
FIG. 5B is a cross-sectional side view of the LVDT of FIG. 4A in accordance with an example embodiment of the disclosed concept.

FIG. 5A is a top view of the LVDT 120 in accordance with an example embodiment of the disclosed concept and FIG. 5B is a cross-sectional side view of the LVDT 120 in accordance with an example embodiment of the disclosed concept. In some example embodiments of the disclosed concept, the LVDT 120 may have a cylindrical shape. However, it will be appreciated that the LVDT 120 may have different shapes without departing from the scope of the disclosed concept.

The LVDT 120 may include a housing 128 as shown in FIGS. 5A and 5B. The housing 127 has a hollow center through which the ore 130 may pass. The housing 128 may include interior compartments respectively containing the primary coil 122, the first secondary coil 124, and the second secondary coil 126. As has been previously described, the primary coil 122 is disposed between the first and second secondary coils 124,126.

Figures 6, 7:
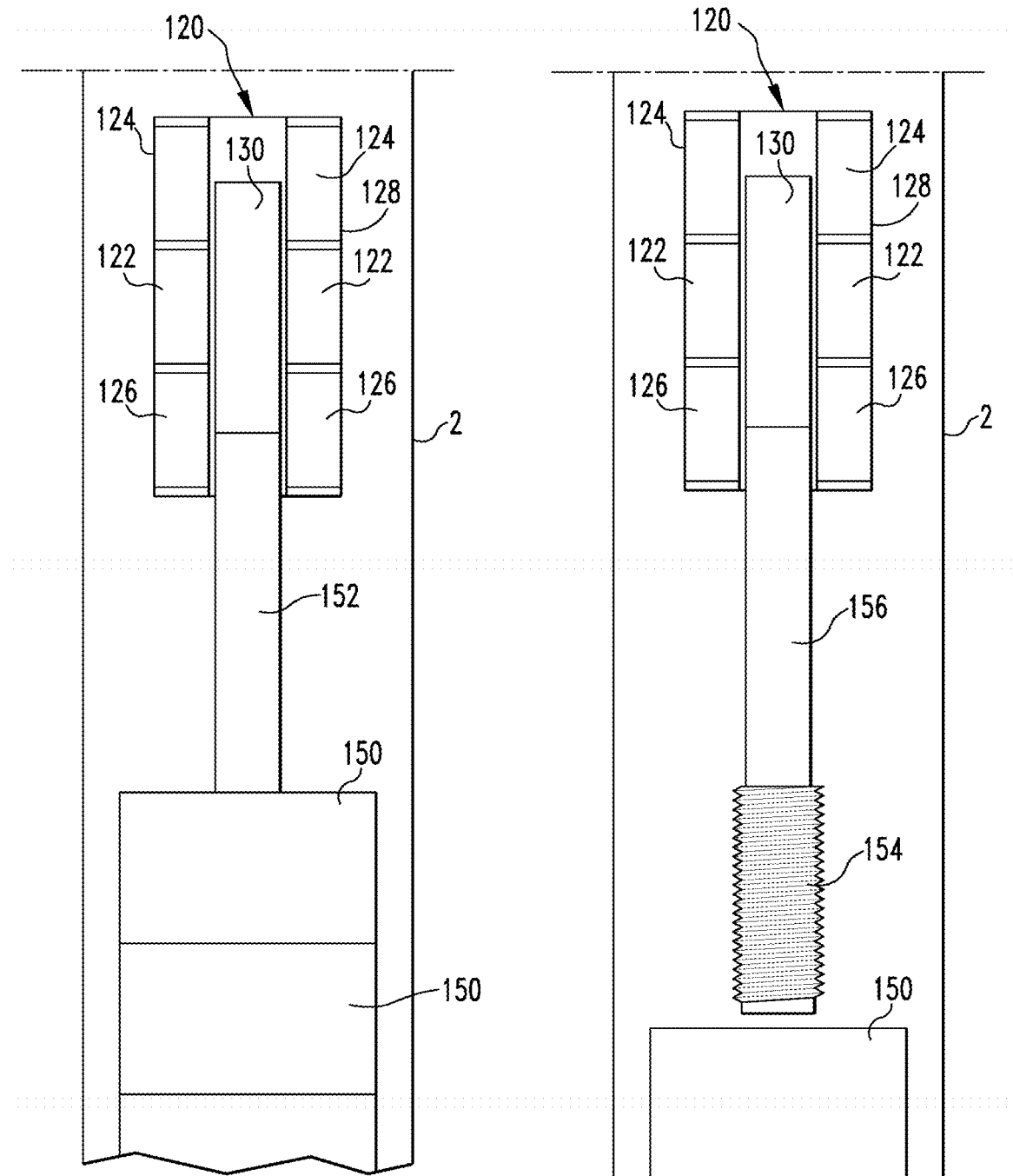
FIG. 6 is a simplified cross-sectional view of a fuel rod including an LVDT in accordance with an example embodiment of the disclosed concept.
FIG. 7 is a simplified cross-sectional view of a fuel rod including an LVDT in accordance with another example embodiment of the disclosed concept.

FIG. 6 is a simplified cross-sectional view of the fuel rod 2 including the LVDT 120 in accordance with an example embodiment of the disclosed concept. As shown in FIG. 6, the core 130 passes through the LVDT 120. The fuel pellets 150 in the fuel pellet stack are physically coupled to the core 130 via an elongated member 152 such as a plunger. In this manner, the core 130 moves within the LVDT 120 in conjunction with expansion or contraction of the fuel pellet stack.

FIG. 7 is a simplified cross-sectional view of the fuel rod 2 including the LVDT 120 in accordance with an example embodiment of the disclosed concept. As shown in FIG. 7, the core 130 passes through the LVDT 120. The core 130 is coupled to a bellows 154 either directly, or via an intermediate member 156. The bellows 154 is structured to expand in response to increasing pressure within the fuel rod 2 and to contract in response to decreasing pressure within the fuel rod 2. In this manner, the core 130 moves within the LVDT 120 in conjunction with changes in pressure within the fuel rod 2.

It will be appreciated that the arrangements shown in FIGS. 6 and 7 may also be employed in conjunction with the sensor system described with respect to FIG. 2 without departing from the scope of the disclosed concept.

Figure 8:
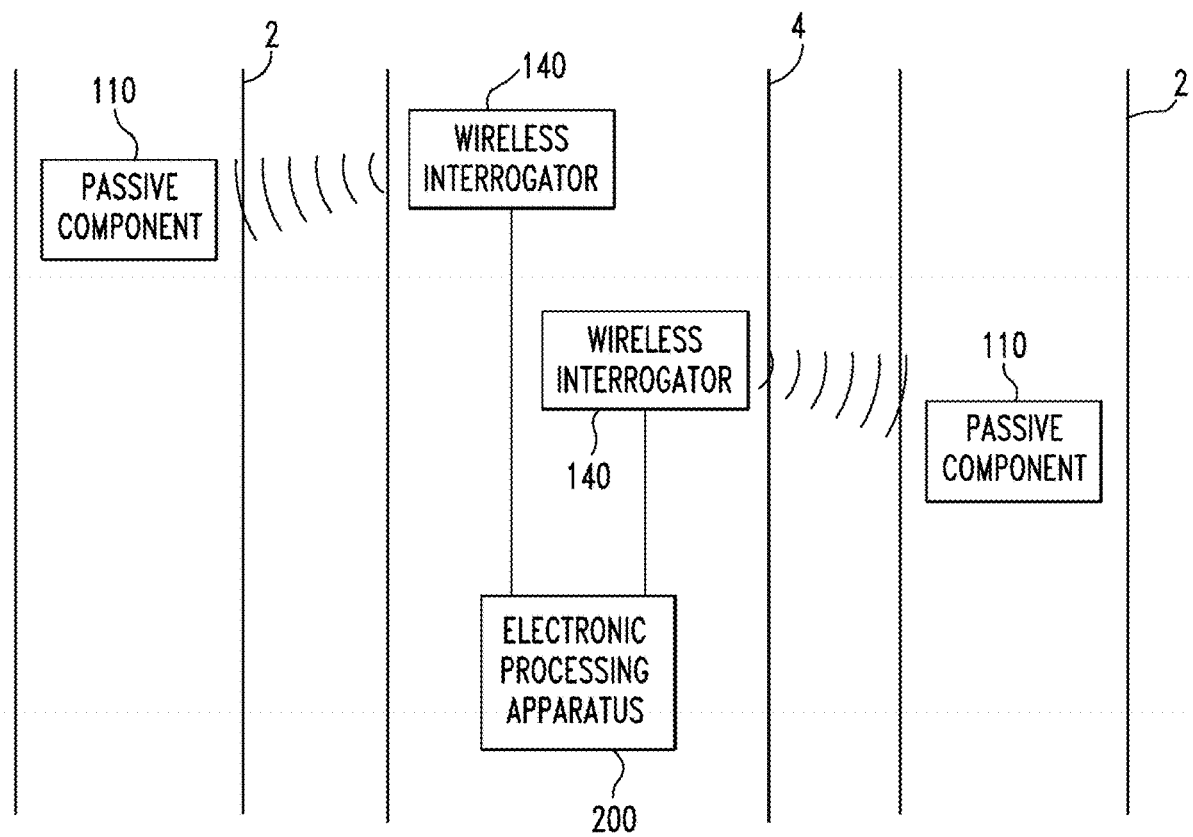
FIG. 8 is a is a schematic diagram of a system including multiple sensors in accordance with an example embodiment of the disclosed concept.

FIG. 8 is a schematic diagram of a system including multiple sensors in accordance with an example embodiment of the disclosed concept. In the example embodiment of FIG. 8, multiple sensors are disposed within close proximity. For example, multiple wireless interrogators 140 are disposed in close proximity to multiple passive components 110. In some example embodiments, the wireless interrogators 140 may output interrogation signals having unique frequencies. That is, one wireless interrogator 140 may output an interrogation signal having a first frequency and another wireless interrogator 140 may output an interrogation signal having a second frequency. The wireless interrogators 140 may each correspond to a respective passive component 110. Due to the close proximity, a wireless interrogator 140 may receive a response signal from a passive component 110 that it does not correspond to. By interrogating signals with unique frequencies, the response signal from the passive component 110 corresponding to the wireless interrogator 140 will have the same unique frequency as the interrogation signal. The electronic processing apparatus 200 may have a frequency filtering function such that it may filter for the unique frequency of the interrogation signal. Thus, even if a wireless interrogator 140 receives response signals from passive components 110 it does not correspond to, those response signals may be filtered out due to their different frequencies.

Figure 9:
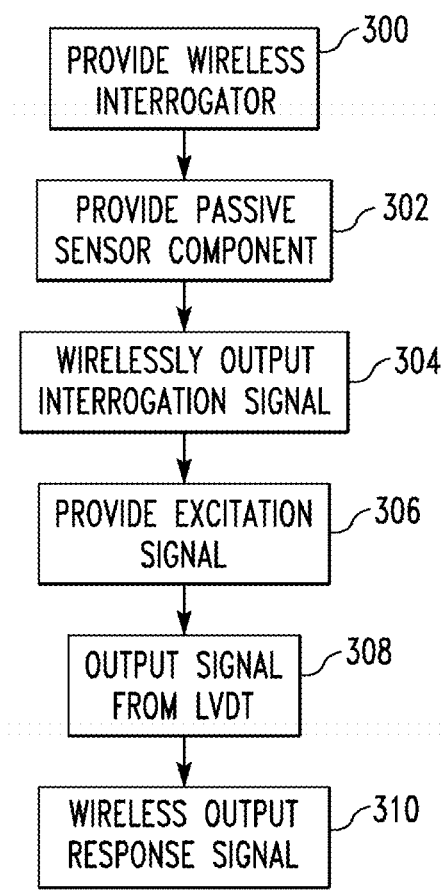
FIG. 9 is a flowchart of a method of sensing fuel rod characteristics in accordance with an example embodiment of the disclosed concept.

FIG. 9 is a flowchart of a method of sensing fuel rod characteristics in accordance with an example embodiment of the disclosed concept. The method of FIG. 9 may be employed in conjunction with the embodiments of the disclosed concept described herein or in other similar applications.

The method begins at 300 by providing a wireless interrogator disposed outside the fuel rod. The wireless interrogator may be the wireless interrogator 140 described in conjunction with embodiments of the disclosed concept. The method continues at 302 by providing a passive sensor component disposed within the fuel rod. The passive sensor component includes an LVDT including a core coupled to the fuel pellet stack such that the core moves in conjunction with expansion or contraction of the fuel pellet stack. The passive sensor component may be the passive sensor component 110 described in conjunction with embodiments of the disclosed concept.

The method continues at 304 with wirelessly outputting an interrogation signal from the wireless interrogator to the passive sensor component. The interrogation signal may be output for example by a primary transmitter of the wireless interrogator and received for example by a primary receiver of the passive sensor component. The method continues at 306 with providing an excitation signal to the LVDT in response to receiving the interrogation signal. The excitation signal may be provided for example by the primary receiver of the passive sensor component.

The method continues at 308 with outputting an output signal indicative of a position of the core from the LVDT. Finally, at 310, the method continues with wirelessly outputting a response signal proportional to the output signal from the passive sensor component to the wireless interrogator. It will be appreciated that the method may include additional steps, the steps of the method may be modified, or the steps of the method may be rearranged without departing from the scope of the disclosed concept.

Figure 10:
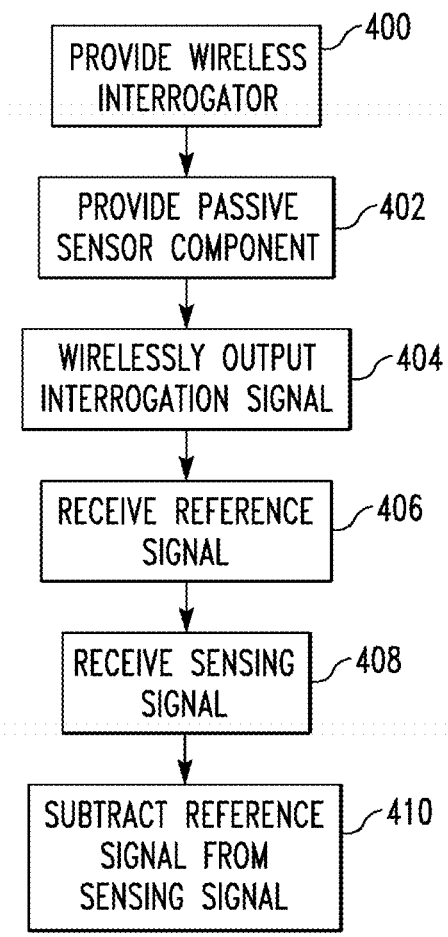
FIG. 10 is a flowchart of a method of sensing fuel rod characteristics in accordance with an example embodiment of the disclosed concept.

FIG. 10 is a flowchart of a method of sensing fuel rod characteristics in accordance with an example embodiment of the disclosed concept. The method of FIG. 10 may be employed in conjunction with the embodiments of the disclosed concept described herein or in other similar applications.

The method begins at 400 by providing a wireless interrogator disposed outside the fuel rod. The wireless interrogator may be the wireless interrogator 50 described in conjunction with embodiments of the disclosed concept. The method continues at 402 by providing a passive sensor component disposed within the fuel rod. The passive sensor component may be the passive sensor component 40 described in conjunction with embodiments of the disclosed concept and may include a sensing transmitter whose output is affected by the sensed parameter and a reference transmitter whose output is not affected by the sensed parameter.

The method continues at 404 with wirelessly outputting an interrogation signal from the wireless interrogator to the passive sensor component. The method continues at 406 with receiving a reference signal from the passive sensor component and continues at 408 with receiving a sensing signal from the passive sensor component. The sensing signal is affected by the sensed parameter while the reference signal is not. The method then continues at 410 with subtracting the reference signal from the sensing signal. The subtracting cancels out temperature drift and other factors that affect all components within the system. It will be appreciated that the method may include additional steps, the steps of the method may be modified, or the steps of the method may be rearranged without departing from the scope of the disclosed concept.

While specific embodiments of the invention have been described in detail, it will be appreciated by those skilled in the art that various modifications and alternatives to those details could be developed in light of the overall teachings of the disclosure and that selected elements of one or more of the example embodiments may be combined with one or more elements from other embodiments without varying from the scope of the disclosed concepts. Accordingly, the particular embodiments disclosed are meant to be illustrative only and not limiting as to the scope of the invention which is to be given the full breadth of the appended claims and any and all equivalents thereof.

What is claimed is:

1. A sensing system, comprising:
   a first component comprising an interrogation system, wherein the interrogation system comprises:
   a first transmitter; and
   a first receiver;
   a second component comprising a receiver system, wherein the receiver system comprises:
   a second receiver configured to receive an interrogation signal from the first transmitter;
   a second transmitter configured to transmit a response signal to the first receiver based on the second receiver receiving the interrogation signal;
   an internal component positioned within the second component; and
   a core operably coupled to the internal component, wherein a magnitude of the response signal from the second transmitter to the first receiver is based on a state of the core; and
   a processor coupled to the first component, wherein the processor is configured to determine a parameter associated with the second component based on the response signal.

2. The sensing system of claim 1, wherein the receiver system further comprises an LVDT, and wherein the state of the core comprises a position of the core relative to the LVDT.

3. The sensing system of claim 2, wherein the core is configured to move relative to the LVDT based on swelling or expansion of the internal component, and wherein the processor is configured to determine elongation of the internal component based on the response signal.

4. The sensing system of claim 2, wherein the core is configured to move relative to the LVDT based on expansion and contraction of the internal component, and wherein the processor is configured to determine internal pressure of the second component based on the response signal.

5. The sensing system of claim 1, wherein the receiver system further comprises an LVDT, and wherein the state of the core comprises magnetic permeability of the core.

6. The sensing system of claim 5, wherein the magnetic permeability of the core is based on temperature of the internal component, and wherein the processor is configured to determine centerline temperature of the second component based on the response signal.

7. The sensing system of claim 1, wherein the interrogation system further comprises a reference receiver, and wherein the receiving system further comprises a reference transmitter configured to transmit a reference signal to the reference receiver based on the second receiver receiving the interrogation signal.

8. The sensing system of claim 7, wherein the processor is configured to determine at least one of elongation of the internal component, centerline temperature of the second component, or internal pressure of the second component based on a difference between the response signal and the reference signal.

9. A sensing system, comprising:
a first component comprising an interrogation system, wherein the interrogation system comprises:
a first transmitter; and
a first receiver;
a second component comprising a receiver system, wherein the receiver system comprises:
a second receiver configured to receive an interrogation signal from the first transmitter;
a second transmitter configured to transmit a response signal to the first receiver based on the second receiver receiving the interrogation signal;
an internal component positioned within the second component; and
a core operably coupled to the internal component, wherein a magnitude of the response signal from the second transmitter to the first receiver is based on a state of the core.

10. The sensing system of claim 9, wherein the receiver system further comprises an LVDT, and wherein the state of the core comprises a position of the core relative to the LVDT.

11. The sensing system of claim 9, wherein the receiver system further comprises an LVDT, and wherein the state of the core comprises magnetic permeability of the core.

12. The sensing system of claim 11, wherein the magnetic permeability of the core is based on temperature of the internal component.

13. The sensing system of claim 9, wherein the interrogation system further comprises a reference receiver, and wherein the receiving system further comprises a reference transmitter configured to transmit a reference signal to the reference receiver based on the second receiver receiving the interrogation signal.

14. A sensing system, comprising:
a first component comprising an interrogation system, wherein the interrogation system comprises:
a first transmitter; and
a first receiver;
a second component comprising a receiver system, wherein the receiver system comprises:
a second receiver configured to receive an interrogation signal from the first transmitter;
a second transmitter configured to transmit a response signal to the first receiver based on the second receiver receiving the interrogation signal; and
a core operably coupled to a component situated within the second component, wherein a magnitude of the response signal from the second transmitter to the first receiver is based on a state of the core.

15. The sensing system of claim 14, wherein the receiver system further comprises an LVDT, and wherein the state of the core comprises a position of the core relative to the LVDT.

16. The sensing system of claim 15, further comprising a processor coupled to the first component, wherein the core is configured to move relative to the LVDT based on swelling or expansion of the component, and wherein the processor is configured to determine elongation of the component based on the response signal.

17. The sensing system of claim 15, further comprising a processor coupled to the first component, wherein the core is configured to move relative to the LVDT based on expansion and contraction of the component, and wherein the processor is configured to determine internal pressure of the second component based on the response signal.

18. The sensing system of claim 14, wherein the receiver system further comprises an LVDT, and wherein the state of the core comprises magnetic permeability of the core.

19. The sensing system of claim 18, further comprising a processor coupled to the first component, wherein the processor is configured to determine centerline temperature of the second component based on the response signal.

20. The sensing system of claim 14, wherein the interrogation system further comprises a reference receiver, and wherein the receiving system further comprises a reference transmitter configured to transmit a reference signal to the reference receiver based on the second receiver receiving the interrogation signal.

* * * * *